(No Model.)
J. W. McGILL.
MOUNTING FOR MINING OR SIMILAR CARS.
No. 542,345. Patented July 9, 1895.
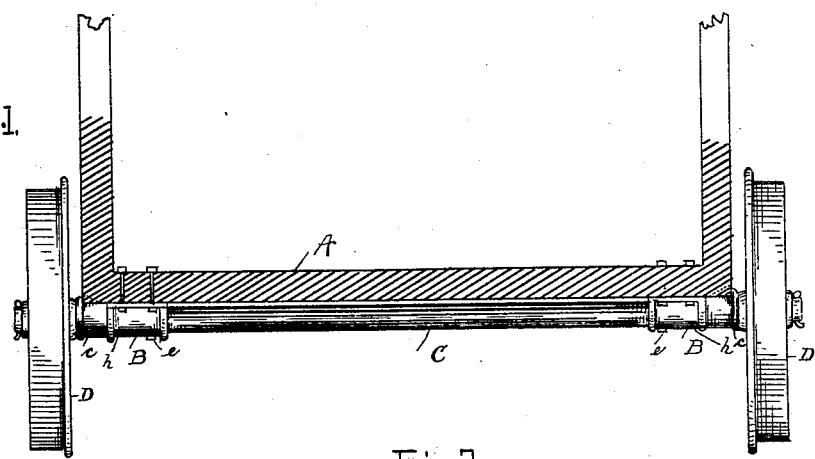
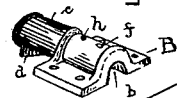
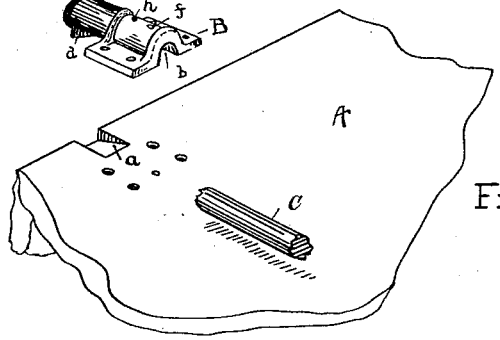
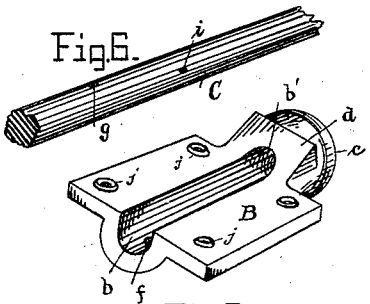
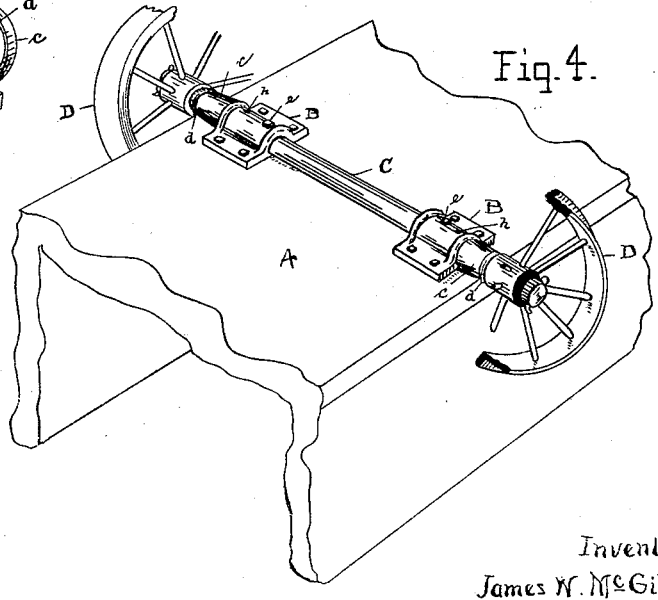
Witnesses
A. Keithley
C. Johnson
Inventor
James W. McGill
By L. M. Thurlow
Atty.

UNITED STATES PATENT OFFICE.

JAMES WILSON McGILL, OF PEORIA, ILLINOIS.

MOUNTING FOR MINING OR SIMILAR CARS.

SPECIFICATION forming part of Letters Patent No. 542,345, dated July 9, 1895.

Application filed October 22, 1894. Serial No. 526,534. (No model.)

*To all whom it may concern:*

Be it known that I, JAMES WILSON MCGILL, a citizen of the United States, residing at Peoria, in the county of Peoria and State of Illinois, have invented certain new and useful Improvements in Mountings for Mining or Similar Cars; and I do hereby declare that the following is a full, clear, and exact description of the invention, which will enable others skilled in the art to which it appertains to make and use the same.

This invention relates to means for mounting mining-carriages on wheels.

The object of the invention is to provide mining and other carriages used in like work with a better means for mounting said carriages or cars on wheels than heretofore.

Up to this time, so far as I am aware, mining-cars have been provided with axles of various designs which are bolted or otherwise secured to the floor of the car and the wheels mounted on the axles and permitted to revolve thereon. This is very well as far as it goes, but after long use the axles are worn unfit for use and must be thrown away, and thus great expense is the result.

It is the purpose of my invention to provide a simple and cheap construction in mining-cars which will permit the axle after being worn to be turned either a quarter or half revolution in a short time and with little trouble, thus presenting several new surfaces to the wearing portion of the wheels.

In the drawings presented herewith, Figure 1 represents a sectional end view of car, showing my device secured thereto. Fig. 2 is a perspective view of one of the bearings. Fig. 3 is a perspective view of the bottom of a car turned upward and showing the position the bearing should occupy. Fig. 4 is also a perspective view of the upturned bottom of a car, showing bearings secured thereto and means of holding the axle therein. Fig. 5 is a perspective view of the under side of one of the bearings. Fig. 6 represents a portion of the shaft, showing holes for reception of bolts for securing the shaft within the bearing.

A represents the car-box; B B, the bearings, or, more properly, clamping-plates.

C represents the shaft or axle, and D D the wheels.

The bearing or clamping-plate B is formed, as shown in Fig. 5, in which the plate is formed with a groove $b$, within which the shaft or axle lies, and one end of said bearing is provided with the head $c$, having a hole $b'$ passing through, which is a continuation of the groove $b$. A projection $d$ forms a part of the head $c$ and is let in the recess $a$ in the bottom of the car to provide seat for said bearing.

The bosses $j$ in the under side of the plate are let into the bottom of the car and these provide a more positive seat for the plate. The bearing or clamping-plate is secured in its proper place by two or more bolts passing through it and the bottom of the car, as shown in Fig. 1. The shaft C is then pushed into place under the bearing. A bolt $e$ passes through the hole $f$ in the bearing, the hole $g$ in the shaft, and through the floor of the car. This holds the shaft securely in place. A hole $h$ is drilled in the bearing and a hole $i$ is drilled through the shaft to correspond with the said hole $h$ in the bearing. The idea of this arrangement is to present several surfaces to the wearing action of the wheel. When the shaft is worn on one side the bolt $e$ may be withdrawn, the shaft turned a quarter of a revolution, and the bolt inserted in the hole $h$, passing through the hole $i$ in the shaft C and the bottom of the car. Where the shaft is worn in this position the bolt is withdrawn and inserted as at first—*i. e.*, in the hole $f$ of the bearing and the hole $g$ in the shaft after turning the shaft a quarter revolution. By means of the bolt and the hole just described the shaft may be used for a very long period of time.

Another advantage of merit in my invention is that the necessary iron or steel for the shaft may be made of the round material as it is made. The metal is cut into sufficient lengths, drilled for the reception of bolts, and put in place. The head $c$ of the bearing B acts as a shoulder for the hub of the wheel to wear against. In practice the bore of the wheel is chilled in the making, thus producing a wheel which stands a great deal of wear.

When the shaft is worn out entirely it may simply be cut in two parts and turned end for end and the previously-worn parts welded together and the free ends used the same as a new shaft.

I claim—

1. In a mining or other car for similar use, means for mounting the same on wheels and consisting of the bearing or clamping plate B bolted to the bottom of said car having the head $c$ and provided with holes $f$ and $h$ the shaft C mounted within said clamping plates and provided with the holes $g$ and $i$, the bolt $e$, arranged substantially as and for the purposes set forth, and the wheels D D revolubly mounted on said shaft C as set forth.

2. In a mining or similar car a bearing plate B having the longitudinal channel $b$, the head $c$ with the lug or projection $d$ and the bore $b$ forming a continuation of the said channel $b$ and said plate B having the holes $f$ and $h$ passing through the said plate B substantially at right angles to each other for the purposes herein set forth and described.

In testimony whereof I affix my signature in presence of two witnesses.

JAMES WILSON McGILL.

Witnesses:
ARTHUR KEITHLEY,
C. JOHNSON.